(12) United States Patent
Zingler et al.

(10) Patent No.: US 11,997,555 B2
(45) Date of Patent: May 28, 2024

(54) CELL SELECTION/RESELECTION BY A USER EQUIPMENT TRYING TO CAMP ON A RADIO CELL OF A PUBLIC LAND MOBILE NETWORK

(71) Applicant: DEUTSCHE TELEKOM AG, Bonn (DE)

(72) Inventors: Olaf Zingler, Bonn (DE); Axel Klatt, Cologne (DE)

(73) Assignee: DEUTSCHE TELEKOM AG, Bonn (DE)

(*) Notice: Subject to any disclaimer, the term of this patent is extended or adjusted under 35 U.S.C. 154(b) by 498 days.

(21) Appl. No.: 17/227,444

(22) Filed: Apr. 12, 2021

(65) Prior Publication Data
US 2021/0235346 A1    Jul. 29, 2021

Related U.S. Application Data

(63) Continuation of application No. 14/888,940, filed as application No. PCT/EP2014/058714 on Apr. 29, 2014, now Pat. No. 11,006,336.

(30) Foreign Application Priority Data

May 6, 2013   (EP) .................................. 13166650

(51) Int. Cl.
*H04W 36/08* (2009.01)
*H04W 48/20* (2009.01)
(Continued)

(52) U.S. Cl.
CPC .......... *H04W 36/08* (2013.01); *H04W 48/20* (2013.01); *H04W 74/0833* (2013.01); *H04W 74/08* (2013.01)

(58) Field of Classification Search
None
See application file for complete search history.

(56) References Cited

U.S. PATENT DOCUMENTS 9,008,659 B1    4/2015  Choi et al.
2001/0011019 A1  8/2001  Jokimies
(Continued)

FOREIGN PATENT DOCUMENTS

EP    2114102 A2    11/2009

OTHER PUBLICATIONS

ETSI, "LTE; Evolved Universal Terrestrial Radio Access (E-UTRA); User Equipment (UE) procedures in idle mode", Technical Specification. Apr. 2013, pp. 1-36, 3GPP TS 36.304, version 11.3.0, Release 11, ETSI, Sophia Antipolis, France.

(Continued)

*Primary Examiner* — Frantz Bataille
(74) *Attorney, Agent, or Firm* — LEYDIG, VOIT & MAYER,LTD.

(57) ABSTRACT

A method for cell selection and/or cell reselection handling includes: performing, by a user equipment, a cell selection and/or cell reselection procedure wherein both a first radio cell and a second radio cell fulfill a cell selection criterion with the first radio cell being prioritized relative to the second radio cell; attempting, by the user equipment, to connect to a public land mobile network using a random access channel of a first base station entity, and failing to connect to the public land mobile network using the random access channel of the first base station entity; and performing, by the user equipment, a modified cell selection and/or cell reselection procedure, under unchanged radio conditions, whereby the user equipment attempts to connect to the public land mobile network using a random access channel of the second base station entity.

12 Claims, 2 Drawing Sheets

(51) Int. Cl.
*H04W 74/0833* (2024.01)
*H04W 74/08* (2009.01)

(56) References Cited

U.S. PATENT DOCUMENTS

| | | |
|---|---|---|
| 2004/0082328 A1 | 4/2004 | Japenga et al. |
| 2004/0162074 A1 | 8/2004 | Chen |
| 2005/0090278 A1 | 4/2005 | Jeong et al. |
| 2006/0084443 A1* | 4/2006 | Yeo .................. H04W 36/0061 455/449 |
| 2008/0220784 A1* | 9/2008 | Somasundaram .......................... H04W 36/00835 455/67.11 |
| 2010/0029274 A1 | 2/2010 | Deshpande et al. |
| 2010/0240368 A1 | 9/2010 | Fox et al. |
| 2011/0151867 A1 | 6/2011 | Hirano et al. |
| 2012/0135731 A1 | 5/2012 | Rangaiah et al. |
| 2014/0057632 A1 | 2/2014 | Hole et al. |
| 2014/0162646 A1 | 6/2014 | Lee et al. |
| 2015/0282034 A1 | 10/2015 | Martin et al. |

OTHER PUBLICATIONS

3GPP, "3rd Generation Partnership Project; Technical Specification Group Radio Access Network; Evolved Universal Terrestrial Radio Access (E-UTRA) Radio Resource Control (RRC); Protocol specification", Technical Specification, Dec. 2007, pp. 1-56, release 8, 3GPP, Sophia Antipolis, France.

* cited by examiner

CELL SELECTION/RESELECTION BY A USER EQUIPMENT TRYING TO CAMP ON A RADIO CELL OF A PUBLIC LAND MOBILE NETWORK

CROSS-REFERENCE TO RELATED APPLICATIONS

This application is a continuation of U.S. patent application Ser. No. 14/888,940, filed Nov. 4, 2015, which is a U.S. National Phase application under 35 U.S.C. § 371 of International Application No. PCT/EP2014/058714, filed on Apr. 29, 2014, which claims benefit to European Patent Application No. EP 13166650.5, filed on May 6, 2013. The International Application was published in English on Nov. 13, 2014 as WO 2014/180714 A1 under PCT Article 21(2). The aforementioned patent applications are hereby incorporated by reference herein in their entireties herein.

FIELD

The present invention relates inter alia to a method for an improved cell selection and/or cell reselection handling by a user equipment that is trying to camp on a radio cell of a public land mobile network, the improved cell selection and/or cell reselection handling being related to an uplink access procedure in dependency of attempts, by the user equipment, to get connected with the public land mobile network using a random access channel of the first base station entity and/or of the second base station entity.

Furthermore, the present invention relates to a public land mobile network or telecommunications network for an improved cell selection and/or cell reselection handling by a user equipment that is trying to camp on a radio cell of a public land mobile network, the improved cell selection and/or cell reselection handling being related to an uplink access procedure in dependency of attempts, by the user equipment, to get connected with the public land mobile network using a random access channel of the first base station entity and/or of the second base station entity.

Additionally, the present invention relates to a user equipment for an improved cell selection and/or cell reselection handling in case that the user equipment tries to camp on a radio cell of a public land mobile network, the improved cell selection and/or cell reselection handling being related to an uplink access procedure in dependency of attempts, by the user equipment, to get connected with the public land mobile network using a random access channel of the first base station entity and/or of the second base station entity.

BACKGROUND

In public land mobile networks, user equipments get initial access to the telecommunications network by means of monitoring a broadcast channel emitted by the base station entity or the concerned radio cell in the vicinity of the current location of the user equipment.

In standardization documents of the Third Generation Partnership Project (3GPP, www.3gpp.org), it is described in detail which procedure the user equipments or mobile terminals have to follow to get initial access to the public land mobile network realized as a cellular mobile network, like for example GSM (Global System for Mobile Communications), UMTS (Universal Mobile Telecommunication System), or E-UTRAN (LTE, Long Term Evolution).

One aspect, beside the radio cell selection and/or cell reselection procedure itself, is the method of accessing the random access channel of the target base station entity (of the target radio cell). Detailed requirements for user equipment procedures are defined in 3GPP documents 3GPP TS 36.304 and 3GPP TS 36.331.

In practice, experience within public land mobile networks shows that the procedure of accessing the random access channel (RACH), hereinafter also called RACH procedure, which is typically the first access of a user equipment or terminal towards the base station entity or base station, e.g. in order to place a call—fails from time to time.

SUMMARY

In an embodiment, the invention provides a method for cell selection and/or cell reselection handling by a user equipment attempting to connect to a public land mobile network using a random access channel of a base station entity. The public land mobile network comprises a first radio cell with a first base station entity and a second radio cell with a second base station entity. The method comprises: performing, by the user equipment, a cell selection and/or cell reselection procedure wherein both the first radio cell and the second radio cell fulfill a cell selection criterion with the first radio cell being prioritized relative to the second radio cell; attempting, by the user equipment, to connect to the public land mobile network using a random access channel of the first base station entity, and failing to connect to the public land mobile network using the random access channel of the first base station entity; and performing, by the user equipment, a modified cell selection and/or cell reselection procedure, under unchanged radio conditions regarding the first base station entity, the second base station entity, and the user equipment, whereby the user equipment attempts to connect to the public land mobile network using a random access channel of the second base station entity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
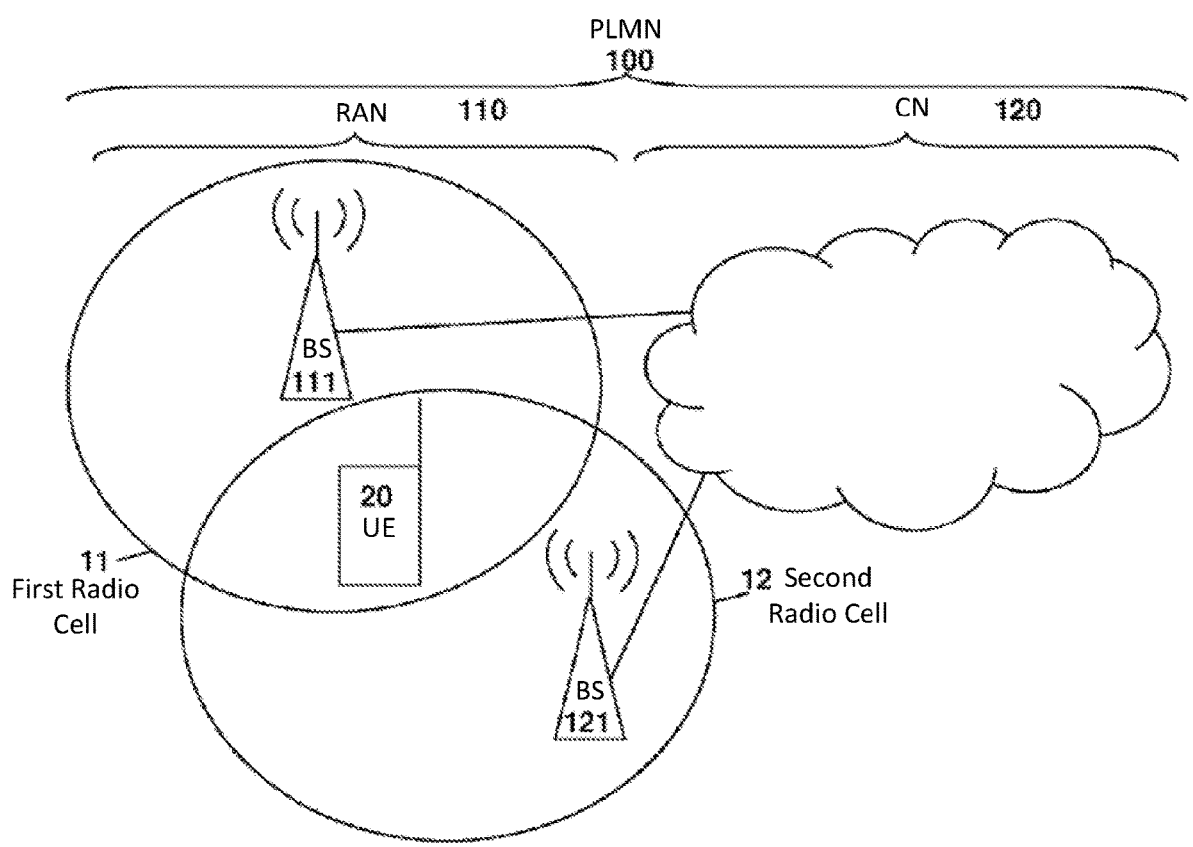
FIG. 1 schematically illustrates an example of a telecommunications network, comprising a core network, a radio access network, a user equipment, and a first and second radio cell.

There can be different reasons which prevent a user equipment from finally getting access to the targeted radio cell or the targeted base station entity (that should—after a successful registration of the user equipment—become the "serving" cell or serving base station entity, e.g. the cell with the best radio signal the user equipment receives). Examples of such reasons include, e.g., a wrong or mismatching uplink cell range configuration in the targeted radio cell, too much path loss which can not be compensated by the user equipment, etc.

Especially during the initial network access of a user equipment towards the public land mobile network, situations appear where
   sufficient downlink field-strengths can be measured from different cells of the same or different radio access technologies (RATs) or from the same or different frequency bands than the targeted radio cell (i.e. all these different radio cells (or the corresponding radio signals received by the user equipment) fulfill the so-called S-criterion and hence allow the user equipment to camp on such cells),
   but the uplink-access procedure (typically using the random access channel, RACH) to the selected serving cell (i.e. the one radio cell (or respective base station entity) chosen in dependency of especially the signal strength and/or signal quality of the different radio signals received by the user equipment, thereby being prioritized according to a ranking) fails, finally.

According to the 3 GPP specifications, the user equipment tries—after an initial failure of accessing the random access channel of the selected target radio cell, i.e. the radio cell being top-ranked based on the signal strength and/or signal quality of the radio signals received by the user equipment—to access the selected/target radio cell, i.e. its random access channel, again (with especially a maximum number of attempts as defined via information obtained from the selected/targeted radio cell, especially distributed or broadcast on the broadcast control channel, BCCH). Further attempts to register with the selected or targeted radio cell after an initial failure of the uplink access procedure by a user equipment can involve using a higher transmission power by the user equipment (especially a higher RACH-power value), especially in case power ramping is used. However, if this further attempt fails or even if these further attempts fail as well, a new cell search procedure has to be initiated.

In case that the physical conditions—especially the situation of the radio environment, the geographic respective locations of the user equipment, and technical parameters such as, e.g., the cell selection and/or cell reselection related parameters, typically broadcast via the broadcast control channel (BCCH) to the user equipment—did not change, the cell selection and/or cell reselection procedure is likely to again select the targeted radio cell of the previous connection attempt, which further connection attempt might end with the same result as the preceding one. Especially in case that the location of the user equipment is not changed (i.e. the user equipment is not moved), e.g. that the UE is a fixed installed (LTE) router, the subscriber will possibly not get any network access at all which can have serious drawbacks that might prove costly to the operator of the public land mobile network.

In an embodiment, the invention provides a method for an improved cell selection and/or cell reselection handling by a user equipment that is trying to camp on a radio cell of a public land mobile network in order to get connected that avoids the drawbacks of the prior art and provides network connectivity and customer service even in situations of problematic radio conditions and/or constellations under which the behaviour of current user equipments can result in not obtaining network connectivity at all.

Figure 2:
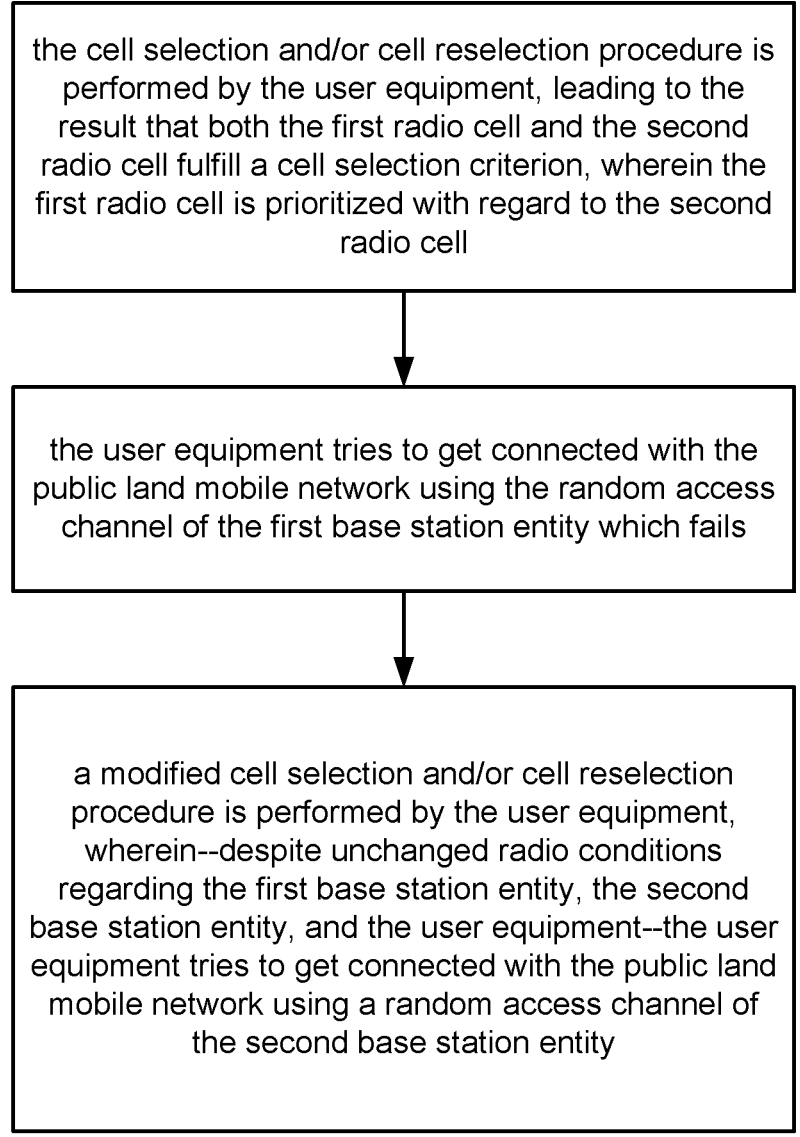
FIG. 2 is a flowchart illustrating an example of a method for an improved cell selection and/or cell reselection handling by a user equipment.

In an embodiment, as depicted in FIG. 2, the invention provides a method for an improved cell selection and/or cell reselection handling by a user equipment that is trying to camp on a radio cell of a public land mobile network, wherein the public land mobile network comprises at least a first radio cell with a first base station entity and a second radio cell with a second base station entity, the improved cell selection and/or cell reselection handling being related to an uplink access procedure in dependency of attempts, by the user equipment, to get connected with the public land mobile network using a random access channel of the first base station entity and/or of the second base station entity, wherein the method comprises the following steps:
   in a first step, the cell selection and/or cell reselection procedure is performed by the user equipment, leading to the result that both the first radio cell and the second radio cell fulfill a cell selection criterion, wherein the first radio cell is prioritized with regard to the second radio cell,
   in a second step, the user equipment tries to get connected with the public land mobile network using the random access channel of the first base station entity which fails,
   in a third step, a modified cell selection and/or cell reselection procedure is performed by the user equipment, wherein—despite unchanged radio conditions regarding the first base station entity, the second base station entity, and the user equipment—the user equipment tries to get connected with the public land mobile network using a random access channel of the second base station entity.

According to the present invention it is advantageously possible to ensure customer service continuation also in problematic radio conditions and/or constellations. The method according to the present invention allows the user equipment—by using the modified cell selection and/or cell reselection procedure proposed—to leave (temporarily) the targeted cell (determined by the user equipment as a result of the cell selection and/or cell reselection and/or cell reselection process in idle mode) on which the user equipment is camped, in case that an access attempt (i.e. the uplink access attempt on the random access channel) with respect to this cell has not been successful either once or after a defined number of such attempts. The proposed method is applicable to any cellular radio network technology, e.g. GSM, UMTS, and provides improvements especially in E-UTRAN (LTE).

According to the present invention, it is advantageously possible to provide the modified cell selection and/or cell reselection procedure such that the targeted radio cell, top-ranked based on the unmodified cell selection and/or cell reselection procedure, will be treated by the user equipment—at least temporally—in a manner such that the user equipment reduces the priority (or the ranking) of that initially targeted radio cell, i.e. the user equipment makes the originally (by applying the unmodified cell selection and/or reselection procedure) top-ranked cell "artificially" worse (in the ranking or prioritization, i.e. the user equipment de-prioritizes that radio cell) than it is (originally, according to the unmodified cell selection and/or reselection procedure) such that, based on the modified ranking or prioritization of the available radio cells, a cell selection and/or cell reselection to a neighboring cell is triggered where access is (at least potentially) possible.

In idle mode of the user equipments, mobility (i.e. cell selection and/or reselection of the user equipment) is controlled by the user equipment, especially based on measurements conducted by the user equipments about the signal strength and/or signal quality of radio signals, especially the broadcast control channel, received from different base station entities in the vicinity of the current position of the user equipment. Based on these measurements, the user equipment determines whether the radio signal received from a base station entity fulfills the so-called S-criterion or cell selection criterion. Typically, the radio signals of a plurality of base station entities (in one or a plurality of frequencies and/or frequency bands and/or using one or a plurality of different radio access technologies) in the vicinity of the user equipment fulfill the cell selection criterion. In this situation, the user equipment has to decide which one of a plurality of suitable base station entities should be the targeted base station entity. According to the 3GPP standardization documents, the user equipment attempts to connect with the public land mobile network using one specific of the suitable base station entities; the one specific (or targeted) base station entity being determined based on the current radio environment of the user equipment and being top-ranked (of all suitable base station entities). In the following, the top-ranked base station entity is also called the first base station entity and another suitable (but initially not top-ranked) base station entity is also called the second base station entity. As described above, situations occur where no radio connection with the top-ranked (or first) base station entity is possible to establish at all (even repeatedly), especially no uplink access to the random access channel of the top-ranked base station entity is available. In such a situation, the inventive method includes—i.e. in a situation after initially having performed, in a first step, the cell selection and/or cell reselection procedure in unmodified form (i.e. according to the standardization) by the user equipment (which leads to the result that both the first radio cell and the second radio cell fulfill the cell selection criterion but the first radio cell being prioritized (or top-ranked or higher-ranked) with regard to the second radio cell), and after unsuccessfully trying, in a second step, to get connected with the public land mobile network using the random access channel of the first base station entity—applying the modified cell selection and/or cell reselection procedure such that (despite unchanged radio conditions regarding the first base station entity, the second base station entity, and the user equipment) the attempt to access the random access channel is directed to the second base station entity instead of the first base station entity. Thus, the first base station entity is de-prioritized or penalized during the modified cell selection and/or cell reselection procedure according to the present invention. Of course, the scenario can also be applied to the second base station entity, i.e. in case that an attempt to access the random access channel of the second base station entity is (once or repeatedly) not successful, also the second base station entity might be de-prioritized (in favor of a further base station entity/third base station entity).

The first and second cells are typically neighboring cells having an at least partly overlapping radio coverage area or at least a geographical area in common where the broadcast radio signals can be received by user equipments. Neighboring cells are cells in close proximity with each other, either on the same frequency or the same frequency band (of the same radio access technology) or on a different frequency.

According to the present invention, it is preferred that the modified cell selection and/or cell reselection procedure is conducted by the user equipment applying a penalty information with respect to the first radio cell, the application of the penalty information with respect to the first radio cell resulting—at least potentially—in a lower priority (or rank) of the first radio cell compared to the priority (or rank) of the second radio cell.

Thereby it is advantageously possible, that by lowering or reducing, e.g. the measured value of the signal strength of the first base station entity or the first cell, a de-prioritization of the first cell takes (probably) place.

Furthermore, it is preferred according to the present invention that the penalty information comprises an offset information, whereby at least one of the following values:
the cell selection RX level value (Srxlev),
the cell selection quality value (Squal),
the measured cell RX level value (RSRP),
the measured cell quality value (RSRQ),
is/are reduced by applying the offset information with respect to the first radio cell.

Thereby, it is advantageously possible according to the present invention that by reducing one of these values by preferably an offset value (being indicated by the offset information), it is possible to de-prioritize the first radio cell or the first base station entity in a simple and easy manner. Alternatively, the penalty information can also refer to a relative modification—i.e. for example a multiplication by 90% or by 80% or the like—of the measured value of the signal strength of the first base station entity or the first cell. Alternatively, the penalty information can also lead to a complete exclusion of the first radio cell from the cell selection and/or cell reselection procedure.

Still furthermore, it is preferred according to the present invention that the penalty information comprises a penalty related timer information, wherein the offset information of the penalty information is applied, when conducting modified cell selection and/or cell reselection procedure, with respect to the first radio cell during a penalty time interval of the length indicated by the penalty related timer information, the penalty time interval starting after the failure, in the second step, of the user equipment trying to get connected with the public land mobile network using the random access channel of the first base station entity.

Thereby, it is advantageously possible according to the present invention to apply the offset information during a predetermined time interval such that indefinite loops of access attempts (comprising cell selection and/or reselection as well as uplink access attempts to the random access channel) can be avoided.

According to another preferred embodiment of the present invention, after the expiration of the penalty time interval, the cell selection and/or cell reselection procedure is conducted by the user equipment without applying the penalty information with respect to the first radio cell.

Thereby, it is advantageously possible according to the present invention that the modified cell selection and/or reselection procedure is applied as seldom as possible, and preferably to reduce occurrences of user equipments that are unable to be connected to the public land mobile network based on the unmodified cell selection and/or reselection procedure.

Furthermore, it is preferred according to the present invention that the penalty information is transmitted by the first base station entity to the user equipment, preferably on a broadcast channel.

Thereby, it is advantageously possible to indicate—by the base station entity to the user equipment—the penalty information such that all user equipments in the respective radio cell can be flexibly informed, i.e. the penalty information can differ from one base station entity (or radio cell) to another.

Alternatively or cumulatively (to transmitting the penalty information by the first base station entity to the user equipment), it is preferred according to the present invention that the penalty information is stored in the user equipment, preferably in a firmware-associated memory of the user equipment.

Thereby, it is advantageously possible to provide user equipments that are more robust in establishing a connection to the public land mobile network even in adverse conditions of the radio environment.

The present invention also relates to a public land mobile network for an improved cell selection and/or cell reselection handling by a user equipment that is trying to camp on a radio cell of a public land mobile network, wherein the public land mobile network comprises at least a first radio cell with a first base station entity and a second radio cell with a second base station entity, the improved cell selection and/or cell reselection handling being related to an uplink access procedure in dependency of attempts, by the user equipment, to get connected with the public land mobile network using a random access channel of the first base station entity and/or of the second base station entity, wherein the public land mobile network is configured such that a penalty information with respect to at least the first radio cell is transmitted to the user equipment, wherein the penalty information causes the user equipment to apply a modified cell selection and/or cell reselection procedure in case that:

a previous cell selection and/or cell reselection procedure has been performed by the user equipment, leading to the result that both the first radio cell and the second radio cell fulfill a cell selection criterion, the first radio cell being prioritized with regard to the second radio cell, and the user equipment having unsuccessfully tried to get connected with the public land mobile network using the random access channel of the first base station entity, wherein the modified cell selection and/or cell reselection procedure results—despite unchanged radio conditions regarding the first base station entity, the second base station entity, and the user equipment—in the user equipment trying to get connected with the public land mobile network using a random access channel of the second base station entity.

Thereby it is advantageously possible according to the present invention to ensure customer service continuation also in problematic radio conditions and/or constellations.

Furthermore, the present invention relates to a user equipment for an improved cell selection and/or cell reselection handling in case that the user equipment tries to camp on a radio cell of a public land mobile network, wherein the public land mobile network comprises at least a first radio cell with a first base station entity and a second radio cell with a second base station entity, the improved cell selection and/or cell reselection handling being related to an uplink access procedure in dependency of attempts, by the user equipment, to get connected with the public land mobile network using a random access channel of the first base station entity and/or of the second base station entity, wherein the user equipment is configured such that a modified cell selection and/or cell reselection procedure is applied by the user equipment in case that:

a previous cell selection and/or cell reselection procedure has been performed by the user equipment, leading to the result that both the first radio cell and the second radio cell fulfill a cell selection criterion, the first radio cell being prioritized with regard to the second radio cell, and the user equipment having unsuccessfully tried to get connected with the public land mobile network using the random access channel of the first base station entity, wherein the modified cell selection and/or cell reselection procedure results—despite unchanged radio conditions regarding the first base station entity, the second base station entity, and the user equipment—in the user equipment trying to get connected with the public land mobile network using a random access channel of the second base station entity.

It is especially preferred according to the present invention that the penalty information is transmitted by at least the first base station entity to the user equipment, preferably on a broadcast channel, and/or that the penalty information is stored in the user equipment, preferably in a firmware-associated memory of the user equipment.

Furthermore, the present invention relates to a program comprising a computer readable program code which, when executed on a computer or on a user equipment, causes the computer or the user equipment to perform the inventive method.

The present invention also relates to computer program product for using a core network of a telecommunications network, the computer program product comprising a computer program stored on a storage medium, the computer program comprising program code which, when executed on a computer or on a user equipment, causes the computer or the user equipment to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a public land mobile network 100, i.e. mobile communication network 100, is schematically shown. The public land mobile network 100 comprises a radio access network 110 and a core network 120. The public land mobile network 100 is a cellular telecommunications network comprising a plurality of network cells or radio cells, three of which are represented in FIG. 1 by means of a solid line and reference signs 11, 12, respectively. Typically, each of the radio cells 11, 12 is produced by or corresponds to a base station entity. Two base station entities 111, 121 are represented in FIG. 1. In the public land mobile network 100, typically a plurality of user equipments are camping on the public land mobile network 100 within the network cells 11, 12, i.e. the user equipments are connected or are camping on one of the base station entities 111, 121 serving the respective cell 11, 12. The base station entities 111, 121 are typically a base station, e.g. BTS (base transceiver station), NodeB or an eNodeB base station. To provide a suitable radio coverage of the user equipments irrespective of their location, the radio cells 11, 12 typically overlap. Furthermore, overlap of the radio cells 11, 12 is provided to ensure coverage of a certain geographical area not only with respect of one radio access technology but with respect to a plurality of radio access technologies, hereinafter also called different layers of radio coverage. Such a network architecture creates a multi-RAT (or multilayer) and/or multi-frequency radio environment in the public land mobile network 100, where a user equipment 20, represented exemplarily in FIG. 1, is located such that it is able to have radio coverage with respect to different radio access technologies and/or with respect to different frequencies or frequency bands of one radio access technology or of different radio access technologies such as GSM (Global System of Mobile communications), GPRS (General Packet Radio System), UMTS (Universal Mobile Telecommunications System), EPS/LTE (Evolved Packet System/Long Term Evolution). Therefore, the user equipment 20 typically has a plurality of possibilities to be connected to the public land mobile network 100 which is represented in FIG. 1 by means of the first radio cell 11 and the second radio cell 12, and the respective base station entities 111, 121, i.e. the first base station entity 111 and the second base station entity 121.

Situations of access failure of the user equipments to the public land mobile network 100, especially leading to an infinity loop can, e.g., occur in the following situation: The first base station entity 111 or first radio cell 11 is assumed to provide the strongest/best radio signal for the user equipment 20 (compared with the second base station entity 121 (or second radio cell 12); this can even be realized in case that the first base station entity 111 is farther away from the user equipment 20 than the second base station entity. In case the first base station entity 111 is sufficiently spaced from the user equipment 20, then the user equipment might be unable to transmit a correctly timed random access request to first base station entity 111. However, the first base station entity 111 would still provide the strongest radio signal and the user equipment is incited not to switch to the second base station entity 121, i.e. the user equipment 20 could be trapped in an infinity loop of still further requests but no successful result.

To solve the explained case of an "infinity loop" within e.g. the initial cell selection process, embodiments of the present invention apply a penalty to the ranking of the first radio cell, by an offset value to the failed selected cell (first radio cell) and to store this value for a configurable time period within the memory of the user equipment. The penalty value can be a configurable offset in dB (e.g. 5 dB or 10 dB or 15 dB or 20 dB or 25 dB) or—alternatively—a special value representing the complete exclusion of the so marked cell (first radio cell 11) within the following cell selection process or plurality of cell selection processes. Preferably, the penalty information is broadcast to the user equipment via the broadcast control channel (e.g. using System Information Block 3 or 4 in a cellular network using the UTRAN standard [3GPP TS 25.331] or System Information Block 3 using an E-UTRAN standard [3GPP TS 36.331]) and can be configured in a cell-individual manner. Alternatively, the penalty information can be fixedly coded in a memory of the user equipment, especially in a firmware memory of the user equipment.

According to the present invention, the penalty information shall be applicable in both the cell-selection methods or procedures according to the Basic Biasing as well as according to the Absolute Priorities method.

In the following cell selection process(es), the penalty information shall be considered as long as the penalty related timer is not expired and shall finally exclude or worsen the marked cell from/within the newly started selection process. This penalty-setting procedure is not limited to a single cell, which means that if also the next uplink-access to an other cell (e.g. to the second radio cell 12) fails, this second radio cell 12 and the first radio cell 11 have to be de-prioritized (or even excluded) from the next run of the cell selection and/or cell reselection process as long as their individual timers are not expired.

A further option according to the present invention includes that as long as the next failed cell is from the same frequency band and radio access technology as the marked cell(s) as before, also their penalty related timer (or penalty time intervals) have to be restarted.

Still a further option according to the present invention includes that the complete list of cells with penalties shall not be permanently stored. This means that, e.g. after a switch off or reset of the user equipment, the list is emptied.

The exclusion of the first radio cell 11 shall not be permanent, because it might be that the radio conditions, network parameters etc. are changed within the next cell selection cycle. Therefore the exclusion is resolved with support of a configurable time interval (indicated by the penalty timer information), e.g. 3 minutes. This time interval might be a fixed defined value in the 3GPP specifications or can be a configurable parameter broadcasted to the user equipment using the broadcast control channel of the first and/or second radio cell 11, 12. It can also be fixedly coded in the firmware of the user equipment. Within this configured time period, the cell shall be not taken into account within the next cell selection process(es) or an extra offset [in dB] shall be added.

Excluded cells can be stored together with time stamps and positions of the user equipment (if available) from the failed network access as part of the MDT-process and transmitted to the public land mobile network after a successful access has been performed.

Furthermore, according to the present invention, if the cell access to a marked cell is successful (e.g. the user equipment moves into significant better radio conditions), then the offset is be removed.

In an exemplary embodiment, the method comprises the following steps: In case a user equipment is camped on a suitable cell, the user equipment performs the following steps Initial access to the RACH of said cell Retry of RACH access according to the current specifications Analyze the RACH Access Response messages; estimation of an RACH overload situation in the serving cell
If RACH overload situation is detected: Reading out access penalty offset value and optionally penalty time
IF RACH is estimated to be not overloaded: Reading out access penalty offset value.

Applying said penalty offset to the current serving cell
Performing cell reselection process according current specifications
Perform cell reselection to other neighbor cell of same frequency, or different frequency or different radio access technology
Re-perform access to RACH in new cell
Continue service operation in new cell as normally.
If during the normal cell reselection procedure, the a cell with the penalty offset is selected and the RACH access was successful, the penalty offset can be removed from the list of cells with penalties
If configurable timer has been defined:
Remove penalty offset from old cell
Perform cell reselection process While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for cell selection and/or cell reselection handling by a user equipment attempting to connect to a public land mobile network using a random access channel of a base station entity, wherein the public land mobile network comprises a first radio cell with a first base station entity and a second radio cell with a second base station entity, the method comprising:
performing, by the user equipment, a cell selection and/or cell reselection procedure wherein both the first radio cell and the second radio cell fulfill a cell selection criterion with the first radio cell being prioritized relative to the second radio cell;
attempting, by the user equipment, to connect to the public land mobile network using a random access channel of the first base station entity, and failing to connect to the public land mobile network using the random access channel of the first base station entity; and
performing, by the user equipment, a modified cell selection and/or cell reselection procedure, under unchanged radio conditions regarding the first base station entity, the second base station entity, and the user equipment, whereby the user equipment attempts to connect to the public land mobile network using a random access channel of the second base station entity;
wherein performing the modified cell selection and/or cell reselection procedure further comprises: applying penalty information with respect to the first radio cell so as to lower a priority of the first radio cell relative to a priority of the second radio cell, wherein the penalty information comprises offset information, and wherein applying the penalty information reduces at least one of the following values with respect to the first radio cell:
the cell selection RX level value (Srxlev),
the cell selection quality value (Squal),
the measured cell RX level value (RSRP), or
the measured cell quality value (RSRQ);
wherein the penalty information is transmitted from the first base station entity to the user equipment, wherein the penalty information comprises penalty timer information, wherein the penalty information is applied during a penalty time interval indicated by the penalty timer information, and wherein the penalty information is configured in an individual cell-specific manner such that each penalized cell of a plurality of penalized cells is configurable with an individual penalty timer;
wherein the method further comprises, in response to successfully accessing a penalized cell having a penalty applied thereto, removing the penalty from the successfully accessed penalized cell.

2. The method according to claim 1, wherein the penalty time interval starts after the user equipment fails to connect to the public land mobile network using the random access channel of the first base station entity.

3. The method according to claim 2, wherein after the expiration of the penalty time interval, the cell selection and/or cell reselection procedure is conducted by the user equipment without application of the penalty information.

4. The method according to claim 1, wherein the penalty information is stored in the user equipment.

5. The method according to claim 4, wherein the penalty information is stored in a firmware-associated memory of the user equipment.

6. The method according to claim 1, wherein the penalty information is transmitted from the first base station entity to the user equipment on a broadcast channel.

7. The method according to claim 1, further comprising:
based on the user equipment having been turned off or reset, emptying a list of penalized cells.

8. The method according to claim 1, further comprising:
restarting a penalty timer for a penalized cell based on failing to connect to a different cell having a same frequency band and radio access technology as the penalized cell.

9. A public land mobile network that facilitates cell selection and/or cell reselection handling for a user equipment attempting to connect to a public land mobile network using a random access channel of a base station entity, wherein the public land mobile network comprises:
a first radio cell with a first base station entity; and
a second radio cell with a second base station entity;
wherein the public land mobile network is configured to facilitate transmission of penalty information with respect to at least the first radio cell to the user equipment, wherein the penalty information causes the user equipment to apply a modified cell selection and/or cell reselection procedure in case of: failure of the user equipment attempting to connect to the public land mobile network using the random access channel of the first base station entity based on a previous cell selection and/or cell reselection procedure performed by the user equipment where both the first radio cell and the second radio cell fulfill a cell selection criterion, with the first radio cell being prioritized relative to the second radio cell;

wherein the modified cell selection and/or cell reselection procedure comprises the user equipment attempting to connect to the public land mobile network using a random access channel of the second base station entity under unchanged radio conditions with respect to the first base station entity, the second base station entity, and the user equipment;

wherein the modified cell selection and/or cell reselection procedure further comprises: applying penalty information with respect to the first radio cell so as to lower a priority of the first radio cell relative to a priority of the second radio cell, wherein the penalty information comprises offset information, and wherein applying the penalty information reduces at least one of the following values with respect to the first radio cell:
the cell selection RX level value (Srxlev),
the cell selection quality value (Squal),
the measured cell RX level value (RSRP), or
the measured cell quality value (RSRQ);

wherein the first base station entity is configured to transmit the penalty information to the user equipment, wherein the penalty information comprises penalty timer information, wherein the penalty information is applied during a penalty time interval indicated by the penalty timer information, wherein the penalty information is configured in an individual cell-specific manner such that each penalized cell of a plurality of penalized cells is configurable with an individual penalty timer, and wherein, in response to successfully accessing a penalized cell having a penalty applied thereto, the penalty is removed from the successfully accessed penalized cell.

10. A user equipment for attempting to connect to a public land mobile network comprising a first radio cell with a first base station entity and a second radio cell with a second base station entity using a random access channel of the first base station entity and/or of the second base station entity, wherein the user equipment comprises: a processor and a memory, wherein the processor, based on execution of instructions stored in the memory, is configured to facilitate:

performing a cell selection and/or cell reselection procedure wherein both the first radio cell and the second radio cell fulfill a cell selection criterion with the first radio cell being prioritized relative to the second radio cell;

attempting to connect to the public land mobile network using the random access channel of the first base station entity, and failing to connect to the public land mobile network using the random access channel of the first base station entity; and performing a modified cell selection and/or cell reselection procedure, under unchanged radio conditions regarding the first base station entity, the second base station entity, and the user equipment, whereby the user equipment attempts to connect to the public land mobile network using the random access channel of the second base station entity;

wherein performing the modified cell selection and/or cell reselection procedure further comprises: applying penalty information with respect to the first radio cell so as to lower a priority of the first radio cell relative to a priority of the second radio cell, wherein the penalty information comprises offset information, and wherein applying the penalty information reduces at least one of the following values with respect to the first radio cell:
the cell selection RX level value (Srxlev),
the cell selection quality value (Squal),
the measured cell RX level value (RSRP), or
the measured cell quality value (RSRQ);

wherein the processor, based on execution of instructions stored in the memory, is further configured to facilitate receiving the penalty information from the first base station entity, wherein the penalty information comprises penalty timer information, wherein the penalty information is applied during a penalty time interval indicated by the penalty timer information, and wherein the penalty information is configured in an individual cell-specific manner such that each penalized cell of a plurality of penalized cells is configurable with an individual penalty timer;

wherein the processor, based on execution of instructions stored in the memory, is further configured to facilitate, in response to successfully accessing a penalized cell having a penalty applied thereto, removing the penalty from the successfully accessed penalized cell.

11. The user equipment according to claim 10, wherein the memory is configured to store the penalty information.

12. A non-transitory processor-readable medium having processor-executable instructions stored thereon for cell selection and/or cell reselection handling by a user equipment attempting to connect to a public land mobile network using a random access channel of a base station entity, wherein the public land mobile network comprises a first radio cell with a first base station entity and a second radio cell with a second base station entity, the processor-executable instructions, when executed by a processor, facilitating performance of the following:

performing, by the user equipment, a cell selection and/or cell reselection procedure wherein both the first radio cell and the second radio cell fulfill a cell selection criterion with the first radio cell being prioritized relative to the second radio cell;

attempting, by the user equipment, to connect to the public land mobile network using a random access channel of the first base station entity, and failing to connect to the public land mobile network using the random access channel of the first base station entity; and performing, by the user equipment, a modified cell selection and/or cell reselection procedure, under unchanged radio conditions regarding the first base station entity, the second base station entity, and the user equipment, whereby the user equipment attempts to connect to the public land mobile network using a random access channel of the second base station entity;

wherein performing the modified cell selection and/or cell reselection procedure further comprises: applying penalty information with respect to the first radio cell so as to lower a priority of the first radio cell relative to a priority of the second radio cell, wherein the penalty information comprises offset information, and wherein applying the penalty information reduces at least one of the following values with respect to the first radio cell:
the cell selection RX level value (Srxlev),
the cell selection quality value (Squal),
the measured cell RX level value (RSRP), or
the measured cell quality value (RSRQ);

wherein the penalty information is transmitted from the first base station entity to the user equipment, wherein the penalty information comprises penalty timer information, wherein the penalty information is applied during a penalty time interval indicated by the penalty timer information, and wherein the penalty information is configured in an individual cell-specific manner such that each penalized cell of a plurality of penalized cells is configurable with an individual penalty timer;

wherein the processor-executable instructions, when executed, further facilitate, in response to successfully accessing a penalized cell having a penalty applied thereto, removing the penalty from the successfully accessed penalized cell.

\* \* \* \* \*